US006671565B1

(12) United States Patent
Kobayashi

(10) Patent No.: US 6,671,565 B1
(45) Date of Patent: Dec. 30, 2003

(54) ELECTRONIC CONTROL APPARATUS HAVING MODE CHECK FUNCTION

(75) Inventor: Hidetoshi Kobayashi, Obu (JP)

(73) Assignee: Denso Corporation, Kariya (JP)

( * ) Notice: Subject to any disclaimer, the term of this patent is extended or adjusted under 35 U.S.C. 154(b) by 402 days.

(21) Appl. No.: 09/703,661

(22) Filed: Nov. 2, 2000

(30) Foreign Application Priority Data

Nov. 30, 1999 (JP) .......................................... 11-339993

(51) Int. Cl.[7] ................................................ G05B 15/00

(52) U.S. Cl. ............................... 700/75; 700/4; 700/14; 700/12; 700/81; 700/87; 701/114; 701/115; 701/113; 701/102; 713/1; 713/2; 712/30; 712/43; 712/229

(58) Field of Search ........................... 712/43, 229, 30, 712/20; 700/12, 14, 40, 75, 2, 4, 86, 87, 81, 79; 340/309.4; 307/41; 123/406.12; 701/101, 102, 105, 99, 113, 66, 114, 115; 709/102; 713/1, 2

(56) References Cited

U.S. PATENT DOCUMENTS 4,337,513 A * 6/1982 Furuhashi .................. 701/114
4,414,626 A * 11/1983 Arai et al. .................... 710/34
4,482,962 A * 11/1984 Amano et al. .............. 701/114
4,623,244 A * 11/1986 Andrews et al. .............. 355/24
4,779,187 A * 10/1988 Letwin ....................... 712/229
4,926,738 A * 5/1990 Kondo et al. ................. 84/618
5,133,057 A * 7/1992 Ishii et al. .................. 717/124
5,182,755 A 1/1993 Sekiguchi et al. ............ 714/55
5,410,476 A * 4/1995 Iizuka ......................... 701/56
5,452,456 A * 9/1995 Mourey et al. ............. 713/100
5,479,338 A 12/1995 Ericksen et al. .............. 700/16
5,526,267 A 6/1996 Sogawa ...................... 701/114
5,602,738 A * 2/1997 Sasaki ........................ 701/115
5,845,134 A * 12/1998 Arai ........................... 713/322
6,026,479 A * 2/2000 Fisher et al. .................. 712/24
6,178,371 B1 * 1/2001 Light et al. ................... 701/93
6,223,716 B1 * 5/2001 Kadota ....................... 123/295
6,341,239 B1 * 1/2002 Hayashi et al. ............... 700/79
6,502,182 B1 * 12/2002 Morishima ................... 712/35
6,577,938 B1 * 6/2003 Bellinger et al. ............. 701/52
6,582,309 B2 * 6/2003 Higurashi et al. ............ 463/31

FOREIGN PATENT DOCUMENTS

DE 4221815 A1 2/1993 ........... G06F/11/16
EP 0607455 A1 3/1994 ........... F02D/45/00

* cited by examiner

*Primary Examiner*—Anil Khatri
*Assistant Examiner*—Crystal J Barnes
(74) *Attorney, Agent, or Firm*—Nixon & Vanderhye P.C.

(57) ABSTRACT

An electronic control apparatus for a control object makes a mode check before each program part is retrieved even at a predetermined start timing, and inhibits a retrieval of program parts unnecessary for operation modes including a normal mode, inspection mode or rewrite mode. As it is not necessary to check the mode in the processing of each program part, the control processing for the control object can be executed efficiently in each mode. As the program parts unnecessary for the specified operation mode is not retrieved either in the specified operation mode, the processing efficiency is increased.

20 Claims, 3 Drawing Sheets

FIG. 4A
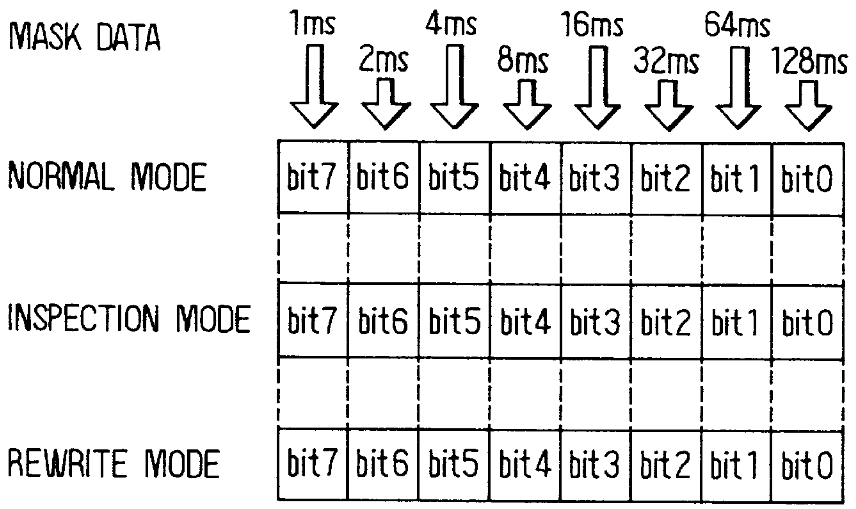
FIG. 4B
| START PERIOD | PROGRAM PARTS |
|---|---|
| 1ms | A<br>⋮ |
| 2ms | B<br>⋮ |
| 4ms | C<br>⋮ |
| ⋮ | ⋮ |
| 128ms | H<br>⋮ |
FIG. 5
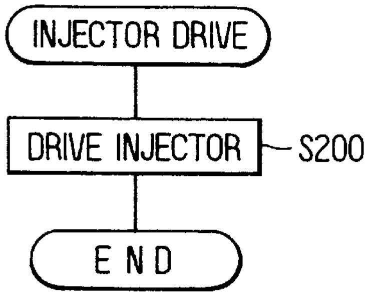
FIG. 6
PRIOR ART
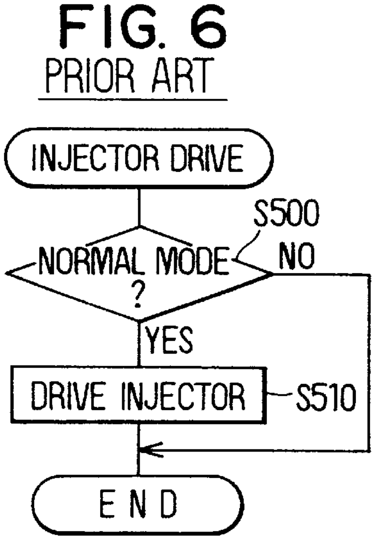

ELECTRONIC CONTROL APPARATUS HAVING MODE CHECK FUNCTION

CROSS REFERENCE TO RELATED APPLICATION

This application is based on and incorporates herein by reference Japanese Patent Application No. 11-339993 filed on Nov. 30, 1999.

BACKGROUND OF THE INVENTION

The present invention relates to an electronic control apparatus for controlling a control object by starting individual programs periodically.

Conventional electronic control apparatuses for controlling a control object (for instance, engine) execute control processing for the control object by executing various processing (for instance, calculation processing and actuator drive processing) at every fixed timing synchronized with operation of the control object (for instance, timing synchronized with a crankshaft rotation of an internal combustion engine). Specifically, a control program for controlling the control object comprises a plurality of individual programs divided based on the contents of control processing. The apparatus starts execution of the individual processing programs at predetermined timings, based on a start processing program which controls timings of retrieving the individual processing programs (that is, starting of execution of the individual processing programs).

Some of the electronic control apparatuses are constructed to be operable in different operation modes in addition to a normal mode for normally controlling the drive of the control object. Such different modes include an inspection mode for inspecting failure in electronic components and wiring patterns of the electronic control apparatus, a rewrite mode for rewriting programs of the electronic control apparatus, and the like.

In those special modes other than the normal mode, it is not necessary to retrieve all the individual processing programs used in the normal mode. The electronic control apparatus results in performing unnecessary operations, if it executes the processing based on all the individual processing programs (that is, all of the individual processing programs necessary for the normal mode) in the same manner as in the normal mode.

The conventional apparatus therefore is constructed to check whether the present operation mode is the normal mode in the processing of each individual processing program immediately after starting its operation. The apparatus executes the normal processing if the check result indicates the normal mode. However, the apparatus inhibits the execution of subsequent processing to prevent the above problem, if the check result indicates the special mode. For instance, an injector drive processing for driving a fuel injector provided in an internal combustion engine is programmed as shown in FIG. 6, as one of the individual processing programs. As shown in FIG. 6, the apparatus first checks at step S500 the operation mode at that time (present time), when the injector drive processing is started at a predetermined timing. If it is the normal mode (S500: YES), the apparatus executes at step S510 the processing for driving the injector (operation to supply drive current to the injector). If it is not the normal mode (S500: NO), the apparatus terminates the injector drive processing without executing the subsequent processing (processing of S510 in this instance).

According to the above construction, however, the execution of the individual processing programs are started at the respective timings irrespective of the operation mode of the electronic control apparatus. The electronic control apparatus thereafter checks the operation mode in each execution of the individual processing programs even when it is in the normal mode. Thus, efficiency of control processing for the control object is lessened.

SUMMARY OF THE INVENTION

The present invention therefore has an objective to improve efficiency of processing in an electronic control apparatus for controlling a control object.

According to the present invention, an electronic control apparatus is constructed to check its operation mode, that is, normal mode or other mode, before each individual processing program is retrieved for execution of the program. Retrieval of the individual processing program unnecessary for a specified one of the operation modes is inhibited. It is thus unnecessary to make the mode check in each execution of the individual processing programs. Thus, the control processing for the control object can be executed efficiently.

BRIEF DESCRIPTION OF THE DRAWINGS

The above and other objects, features and advantages of the present invention will become more apparent from the following detailed description made with reference to the accompanying drawings. In the drawings:

FIGS. 4A and 4B are diagrams showing data tables defining a correspondence among mask data, processing start timings and program parts of each operation mode used in executing the time-synchronized start control in the embodiment;

FIG. 5 is a flow chart showing an injector drive processing executed as one individual processing program in the embodiment; and FIG. 6 is a flow chart showing an injector drive processing executed as one individual processing program in a conventional apparatus.

DETAILED DESCRIPTION OF THE PREFERRED EMBODIMENT

Figure 1:
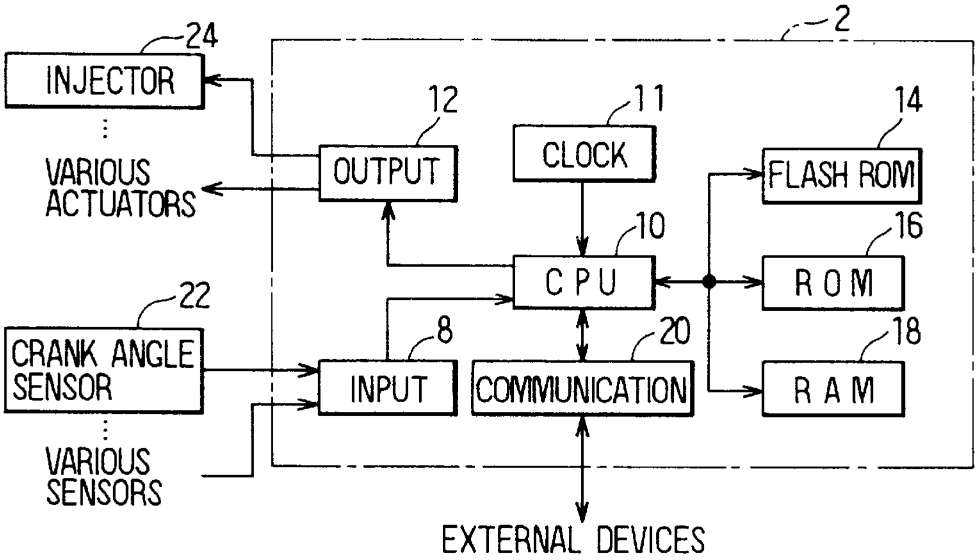
FIG. 1 is a block diagram showing an electronic control apparatus according to an embodiment of the present invention.

The present invention is described in detail with reference to an embodiment in which an electronic control apparatus (ECU) 2 is constructed to control an internal combustion engine (not shown) as shown in FIG. 1.

The ECU 2 has an input circuit 8, a CPU 10, a clock generator 11, an output circuit 12, a flash ROM 14, a non-volatile ROM 16, a volatile RAM 18 and a communication circuit 20. The input circuit 8 is for receiving signals from various sensors such as a crank angle sensor 22 that output the signals indicative of the engine operating conditions. The CPU 10 is for calculating an optimum amounts of control for the engine based on the signals received by the input circuit 8 and outputting control signals based on the calculation results. The clock generator 11 is for applying clock signals of a fixed frequency to the CPU 10. The output circuit 12 is for driving various actuators such as an injector 24 that injects fuel into the engine in response to the control signals from the CPU 10. The flash ROM 14 is for storing a control program and control data necessary for the CPU 10 to control the engine. The volatile RAM 18 is for temporarily storing the calculation results of the CPU 10. The communication circuit 20 is for executing communications between the ECU 2 and external devices such as a memory rewrite device for rewriting the storage content of the flash ROM 14 from the outside and an inspection device.

The flash ROM 14 is a non-volatile memory which is capable of electrically deleting and rewriting data and stores check information as described hereunder. It stores therein a start program for periodically starting a processing of the control program at a fixed timing as a part of the engine control program. The ROM 16 is incapable of rewriting data. It stores a boot program and data of the ECU 2.

The CPU 10 executes a processing based on the boot program, when the ECU 2 constructed as above is supplied with electric operating power. With the electric power supply, an operation system which is a basis of the processing operation of the ECU 2 becomes operable and each part of the ECU 2 becomes operable. With an additional function of the-operation system, the CPU 10 measures time by counting the clock signals of the clock generator 11 and starts a time-synchronized start control processing shown in FIG. 2 at every predetermined time period (every 1 ms).

The time-synchronized start control processing is a processing which the CPU 10 executes before executing other individual processing programs. Specifically, it is the processing that periodically starts program parts as individual processing programs in synchronization with time, that is, in synchronization with the signals from the clock generator 11. This processing is represented functionally as a time-synchronized start controller (processing start program) 10A as shown in FIG. 3A.

Figure 3A:
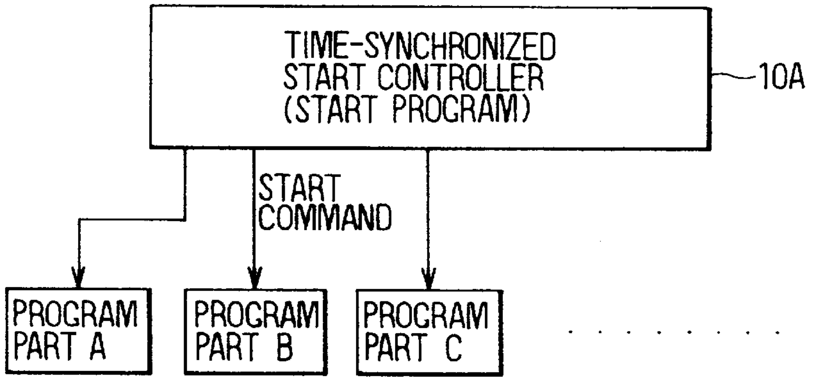
FIGS. 3A and 3B are functional diagrams functionally showing a control program comprising a plurality of individual processing programs executed in the embodiment.
Figure 3B:
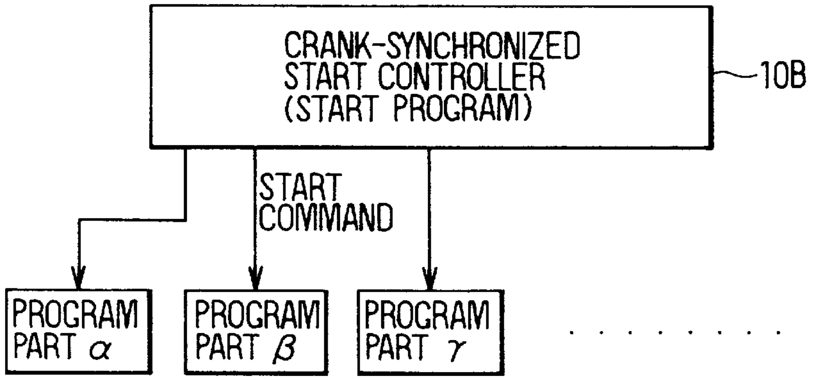

As shown in FIGS. 3A and 3B, the control for the engine is realized by processing that includes program parts A, B, C and the like constructed to execute the time-synchronized processing, and program parts α, β, γ and the like constructed to execute processing synchronized with the rotation of the crankshaft of the engine. In the ECU 2, the program parts are not constructed exclusively for controlling the engine. The program parts include program parts necessary only in a normal mode for controlling the engine, program parts necessary only in a special operation mode such as an inspection mode and a rewrite mode other than the normal mode, and program parts necessary for any operation modes that are required to execute processing of writing control data into RAM 18 at every predetermined time period.

The program parts such as the program parts A, B, C and the like for executing the time-synchronized processing are retrieved in response to processing start commands from the time-synchronized start controller 10A. The program parts such as the program parts α, β, γ and the like for executing the crank-synchronized processing are retrieved in response to processing start commands from the crank-synchronized start controller 10B. The time-synchronized start controller 10A and the crank-synchronized start controller 10B corresponds to a start program. The time-synchronized start controller 10A operates at every 1 ms, and the crank-synchronized controller 10B operates at every predetermined angular rotation (7.5° CA in the embodiment) of the crankshaft.

Figure 2:
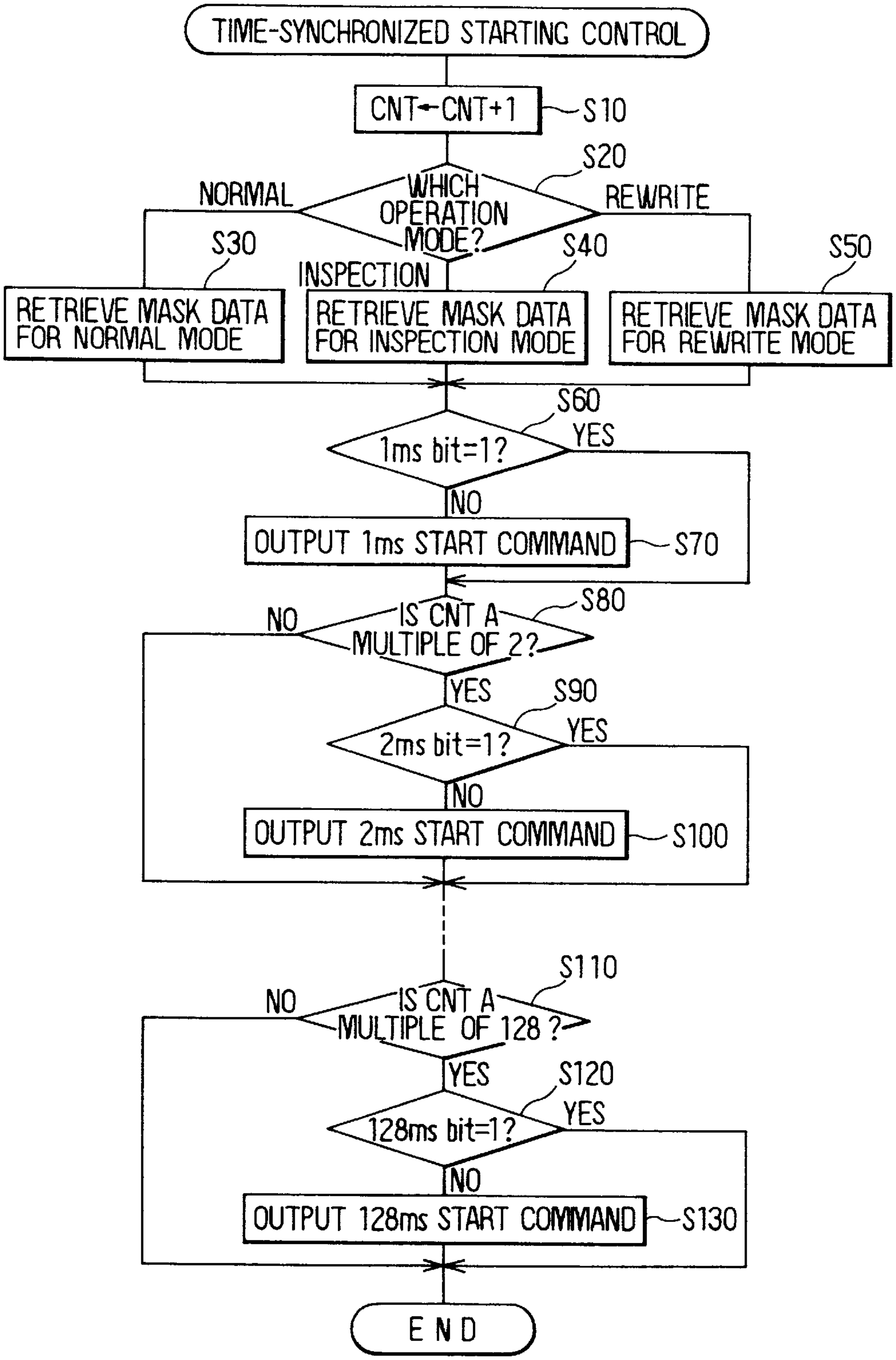
FIG. 2 is a flow chart showing a time-synchronized start control processing executed in the embodiment.

Referring to FIG. 2, when the time-synchronized start control processing starts, a count value CNT is incremented by one at step S10. This count value CNT is a variable defined in the RAM 18 to count the number of starts of the time-synchronized start control processing after the electric power is supplied to the ECU 2. It is reset (set to zero) each time the electric power is supplied to the ECU 2. The count is started again from 0 when it reaches the upper limit, because the bit length of the count value CNT is limited.

It is checked at step S20 after step S10 in which operation mode the ECU 2 is at present. If the mode check result indicates that the operation mode of the ECU 2 is the normal mode, a mask data for the normal mode shown in FIG. 4A is retrieved at step S30. This mask data includes information whether it is necessary or unnecessary for the normal mode with respect to each of the program parts having the same processing start timing. This mask data is constructed as a bit pattern of 8 bits each of which is set to 0 and 1 for the necessary one and the unnecessary one, respectively.

Specifically, it is defined so that, as shown in FIG. 4B, the program parts A, B, C and the like retrieved in synchronism with time are set to have any one of start periods which are 1 ms, 2 ms, 4 ms, 8 ms, 16 ms, 64 ms and 128 ms. Each of these start periods is an integer multiple of the processing start period of the time-synchronized start controller 10A, specifically a multiple of $2^n$ with n being an integer. A plurality of program parts are allocated to corresponding start timings. FIG. 4B indicates an information table defining a correspondence between the start periods and the program parts. The output of the start command is made based on this information table.

The mask data for the normal mode defines whether each program part is necessary (0) or unnecessary (1) in the normal mode with respect to each processing start timing. For instance, the seventh bit (bit7) of the mask data is the information that defines whether the program parts the start timing of which is 1 ms (program part A, etc. in FIG. 4B) are the necessary one or the unnecessary one in the normal mode. The sixth bit (bit6) is the information that defines whether the program parts the processing start timing of which is 2 ms (program part B, etc. in FIG. 4B) are the necessary ones or the unnecessary ones in the normal mode. In the similar manner, the fifth bit (bit5), fourth bit (bit4), third bit (bit3), second bit(bit2) and first bit (bitl) correspond to the processing start timings of 4 ms, 8 ms, 16 ms, 32 ms, 64 ms and 128 ms, respectively.

The ECU 2 is constructed to be operable in other operation modes such as the inspection mode, rewrite mode or the like as the special operation mode other than the normal mode. The inspection mode is an operation mode for inspecting hardware constituting the ECU 2. For instance, it inspects whether a electrical wiring pattern is shorted, or whether electronic components such as transistors are operating normally. The rewrite mode is an operation mode for rewriting the control program stored in the flash ROM 14 through the communication circuit 20 by external operation. Mask data are also provided for each of the operation modes other than the normal mode in the same format as that of the normal mode.

That is, the mask data for the inspection mode includes information which define whether necessary (0) or unnecessary (1) for the inspection mode with respect to each of the start timings (1 ms through 128 ms). The mask data for the rewrite mode includes information which define whether necessary (0) or unnecessary (1) for the rewrite mode with respect to each of the start timings (1 ms through 128 ms).

These mask data for the inspection mode and the rewrite mode correspond to the check information. If the check result of the mode check processing at step S20 indicates the inspection mode, the mask data for the inspection mode is retrieved at step S40. If the check result indicates the rewrite mode, the mask data for the rewrite mode is retrieved at step S50. The mask data (mask data for the normal mode, inspection mode and rewrite mode) are stored in the flash ROM 14 which stores therein the check information. The flash ROM 14 is capable of rewriting those data from the outside through the communication circuit 20.

After the mode check at S20 and the retrieval of the mask data in correspondence with the check result at any of steps S30 to S50, it is checked at step S60 whether the bit for 1 ms (that is, seventh bit bit7) is 1 or not. Here, the bit for "XX" ms means the bit which corresponds to the start timing of every XX ms.

If the bit for 1 ms is 1 (S60: YES), it is determined that the processing of the program parts (program parts A, etc.) the start timing of which is every 1 ms is not started, thus proceeding to step S80. If the bit for 1 ms is not 1 (S60: NO), a 1 ms start command is output at S70 and then step S80 is executed. Here, the XX ms start command means the execution of the processing of the program part the start timing of which is every XX ms.

At the following step S80, it is checked whether it is the start timing of every 2 ms by checking whether the count value CNT is a multiple of 2. Because the time-synchronized start control processing is initiated every 1 ms, it becomes the start timing of every 2 ms when the control processing is initiated. twice.

If the count value CNT is a multiple of 2 (S80: YES), it is checked at step S90 whether the bit for 2 ms is 1. If the bit for 2 ms is not 1 (S90: NO), a 2 ms start command is output at step S100, then proceeding to processing (not shown) for checking whether it is the start timing of every 4 ms.

If the count value CNT is not a multiple of 2 (S80: NO) or the bit for 2 ms is 1 (S90: YES), the processing proceeds to a processing for checking whether it is the start timing of every 4 ms, without outputting the 2 ms start command.

In the similar manner, it is checked in sequence whether the present time is the predetermined start timing (4 ms to 64 ms). If the check result indicates that it is the predetermined start timing and the bit corresponding to the start timing is not 1, the processing of the program parts of that start timing is executed. However, the processing of the program parts of that start timing is inhibited even if it is the predetermined start timing, when the bit corresponding to the start timing is 1.

It is checked at step S110 whether the count value CNT is a multiple of 128 thereby to check whether it is the start timing of every 128 ms. If the check result indicates that the count value CNT is a multiple of 128 (S110: YES), it is further checked at step S120 whether the bit for 128 ms is 1. If the bit for 128 ms is not 1 (S120: NO), a 128 ms start command is output at step S130, thus ending the time-synchronized start control processing.

If the count value CNT is not a multiple of 128 (S110: NO) or the bit for 128 ms is 1 (S120: YES), on the other hand, the 128 ms start command is not output, thus ending the time-synchronized start control processing.

As described above, the time-synchronized start control processing executed by the time-synchronized start controller 10A determines the start timings by frequency-dividing its own start period of 1 ms as a basic or unit period. That is, it determines the start timing of 2 ms period by dividing the basic period into 1/2 and the start timing of 4 ms period by dividing the basic period into 1/4. In the similar manner, the start timing of fixed periods (8 ms, 16 ms, 32 ms, 64 ms and 128 ms) are determined by dividing the basic period into fixed ratios (1/8, 1/16, 1/32, 1/64 and 1/128), respectively.

Moreover, the mode check is made before outputting the processing start command at each start timing, that is, at every start timing. If the operation mode is other than the normal mode, retrieval of the program parts which are unnecessary for that operation mode is inhibited. Thus, steps S60, S90 and S120 function to inhibit the output of the processing start command.

The ECU 2 according to the embodiment also executes the crank-synchronized start control processing (not shown) by the crank-synchronized controller 10B in addition to the processing by the time-synchronized start controller 10B. The crank angle sensor 22 generates the signals (crank angle signals) synchronized with the rotation of the crankshaft of the engine, and the CPU 10 calculates the rotational angle of the crankshaft based on the crank angle signal by way of its additional function of the operation system.

An interrupt signal is generated at every predetermined crank angle rotation (7.5° CA). The crank-synchronized start control processing by the crank-synchronized controller 10B uses the period of generation of the interrupt signal as its basic or unit period, and sets the start timings, for instance every 7.5° CA, 15° CA, 30° CA and the like, by frequency-dividing the basic period by predetermined ratios, respectively. It starts only the processing of program parts corresponding to the present operation mode based on mask data (not shown) for the normal mode, the inspection mode and the rewrite mode. That is, the processing by the crank-synchronized controller 10B is started in synchronism with the operation of the engine which is the control object. Thus, the predetermined program parts are retrieved periodically in synchronism with the engine operation.

As one of the individual processing which the CPU 10 executes a injector drive processing for driving injectors is shown in FIG. 5. As described above, the ECU 2 (CPU 10), particularly the start controller, executes the mode check to retrieve only the program parts determined to be necessary for the operation mode. Therefore, it is not necessary to check the mode in the course of processing the program parts. For instance, like the injector drive processing, only the processing of driving the injector (supplying drive current) is executed at step S200 immediately after this processing is started. Thus, it is only necessary to execute the processing which is practically necessary without executing any other processing such as the mode check.

According to the ECU 2 of the embodiment constructed as above, the mode check is made before the retrieval of each program part, even when it becomes the processing start timing. The retrieval of program parts that are determined to be unnecessary for the operation mode (normal mode, inspection mode or rewrite mode) is inhibited (S60, S90, S120, etc.). Therefore, it is not necessary to make a mode check in the course of processing each program part, and hence the control processing for the control object can be executed efficiently.

Moreover, the processing efficiency is increased in the special operation mode other than the normal mode, because the individual processing program unnecessary for the special operation mode is not retrieved. That is, when other processing is retrieved in the course of execution of one program, the execution of the processing currently being executed is temporarily interrupted, and the interrupted execution of the processing is restarted after completing the execution of the other processing. It is normally required to store the internal condition of the CPU 10 (that is, values of a program counter or various registers) existing immediately before the interruption in the stack region of the RAM 18. However, according to the embodiment, such a temporary interruption processing is not required and the processing load can be reduced, because the individual processing program unnecessary for the special operation mode is not retrieved.

Further, the program parts unnecessary for each special operation mode (normal mode, inspection mode rewrite mode) can be determined based on the mask data (FIG. 4A) of each operation mode. As a result, even if the program parts which were unnecessary for the inspection mode or the rewrite mode are to be changed to the necessary one due to specification changes, it is only necessary to rewrite the content in the mask data. The change may be implemented with ease even when the programs are copied into other types.

Further, as the mask data is stored in the flash ROM 14 which is electrically rewritable non-volatile type memory, the setting may be changed with ease even after the ECU 2 is put in the market.

Moreover, the program parts are divided into the necessary one and the unnecessary one for the inspection mode and the rewrite mode with respect to the same start timing (that is, by grouping the program parts based on the start timings and considering the program parts in each group as one unit). Thus, the mask data is constructed to enable checking of the program parts unnecessary for each mode (normal mode, inspection mode and rewrite mode) based on the start timings. The mode is checked before outputting the start command, and the mask data is referred to based on the timing of the mode check and the determined mode, so that the program parts unnecessary for the operation mode may be determined.

That is, it is not checked one by one as to whether the program part is necessary or unnecessary for the operation mode. Rather, it is checked as to whether the program part is necessary or unnecessary for the operation mode with respect to all the program parts having the same start timing based on the start timing predetermined for each program part. Therefore, the check processing can be executed quickly and the efficiency of processing of the ECU 2 can be increased.

Moreover, the mask data which has the same data format as the mask data for the inspection mode or the rewrite mode (that is, for the special operation mode other than the normal mode) is also provided for the normal mode, so that the retrieval of the program part unnecessary for the normal mode is inhibited. As a result, the program parts which were unnecessary for the normal mode can be changed to the necessary one and the unnecessary one can be changed to the necessary one upon specification changes.

The present invention is described as above with reference to one embodiment. However, the present invention is not limited to the above embodiment but may be implemented in various ways. For instance, the special mode other than the normal mode referred to in the embodiment is not limitative. Further, the electronic control apparatus may be modified to control other objects other than the engine as long as a control object is controlled by starting individual control programs (program parts) by a processing start program (start controller).

What is claimed is:

1. An electronic control apparatus operable in a plurality of operation modes including a normal mode for controlling a control object and in a special mode other than the normal mode, the apparatus comprising:

a plurality of processing means for executing individual processing at predetermined timings based on individual processing programs into which a control program for controlling a control object is divided with respect to each processing content; and start control means constructed to be capable of starting each of the processing means by outputting a start command at a start timing predetermined for each individual processing program, based on a start program for periodically starting processing of the individual processing programs, wherein the start control means checks operation modes of the electronic control apparatus before outputting the start command at the start timing, and inhibits an output of the start command to the processing means corresponding to individual processing programs unnecessary for a specified one of the operation modes to be executed and outputs the start command to the processing means corresponding to only individual processing programs necessary for the specified one of the operation modes, when the specified operation mode is the special mode.

2. An electronic control apparatus as in claim 1 further comprising:

check information storage means for storing check information indicative of the individual processing programs unnecessary for the specified operation mode, wherein the start control means determines the individual processing programs to be unnecessary for the specified operation mode by referring to the check information when the check result indicates that the operation mode is the specified operation mode, and inhibits the output of the start command to the processing means corresponding to the individual processing programs determined to be unnecessary.

3. An electronic control apparatus as in claim 2, wherein:

the individual processing programs are divided into two types with respect to the individual processing programs which have the same start timings, one and the other of the two types being necessary and unnecessary for the specified operation mode;

the check information is constructed to be capable of determining from the start timings the individual processing programs unnecessary for the specified operation mode; and the start control means determines the individual processing programs unnecessary for the specified operation mode by referring to the check information based on the start timing at the time of checking when the check result indicates that the operation mode of the electronic control apparatus is the specified operation mode.

4. An electronic control apparatus as in claim 2, wherein:

the check information stored in the check information storage means includes, with respect to each of the operation modes, a plurality of data bits corresponding to the start timings; and each bit is set to 0 or 1 to indicate that an execution of the individual processing program is necessary or unnecessary at the corresponding start timing.

5. An electronic control apparatus as in claim 2, wherein:

the specified operation mode is the special mode that includes a check mode for checking an operation of the electronic control apparatus and the rewrite mode is for rewriting the check information stored in the check information storage means.

6. An electronic control apparatus as in claim 5, wherein:

the start control means includes mode check means that determines the specified operation mode of the electronic control apparatus before outputting the start commands at the start timings and retrieves only the individual processing program corresponding to the determined specified operation mode from the check information storage means.

7. An electronic control apparatus as in claim 2, wherein:

the check information storage means is a non-volatile memory which is capable of electrically rewriting data.

8. An electronic control apparatus as in claim 1, wherein:

the control object is an internal combustion engine of a vehicle; and the start control means periodically starts the start control program in synchronization with rotation of the engine.

9. An electronic control apparatus as in claim 1, wherein:

an operation mode check is not included in any of the individual processing programs and is included only in the start control means.

10. An electronic control apparatus as in claim 1, wherein:

the specified operation mode is the special mode that includes a check mode for checking an operation of the electronic control apparatus and a rewrite mode for rewriting the operation modes of the individual processing programs.

11. An electronic control apparatus operable in a plurality of operation modes including a normal mode for controlling a control object and a special mode other than the normal mode, the apparatus comprising:

a memory storing therein individual processing programs into which a control program for controlling a control object is divided, and a start control program which determines necessity of the individual processing programs to be executed with respect to each of the operation modes; and a processing unit constructed to execute the individual processing programs at respective fixed timings and the start control program, wherein the processing unit is constructed to execute first the start program for determining a specified one of the operation modes to be executed and generating a start command to retrieve only the individual processing programs necessary for the specified operation mode from the memory if the specified one of the operation modes is the special mode other than the normal mode, and then execute the retrieved individual processing programs periodically at the respective fixed timings.

12. A method of operating electronic control apparatus in a plurality of operation modes including a normal mode for controlling a control object and in a special mode other than the normal mode, the method comprising:

providing a plurality of processing parts for executing individual processing at predetermined timings based on individual processing programs into which a control program for controlling a control object is divided with respect to each processing content; and starting each of the processing parts by outputting a start command at a start timing predetermined for each individual processing program, based on a start program for periodically starting processing of the individual processing programs, checking operation modes of the electronic control apparatus before outputting the start command at the start timing, and inhibiting an output of the start command to the processing parts corresponding to individual processing programs unnecessary for a specified one of the operation modes to be executed and outputting the start command to the processing parts corresponding to only individual processing programs necessary for the specified one of the operation modes, when the specified operation mode is the special mode.

13. A method as in claim 12 further comprising:

storing check information indicative of the individual processing programs unnecessary for the specified operation mode, determining the individual processing programs to be unnecessary for the specified operation mode by referring to the check information when the check result indicates that the operation mode is the specified operation mode, and inhibiting the output of the start command to the processing parts corresponding to the individual processing programs determined to be unnecessary.

14. A method as in claim 13, wherein:

the individual processing programs are divided into two types with respect to the individual processing programs which have the same start timings, one and the other of the two types being necessary and unnecessary for the specified operation mode;

the check information is constructed to be capable of determining from the start timings the individual processing programs unnecessary for the specified operation mode; and the individual processing programs is determined to be unnecessary for the specified operation mode by referring to the check information based on the start timing at the time of checking when the check result indicates that the operation mode of the electronic control apparatus is the specified operation mode.

15. A method as in claim 13, wherein:

the stored check information includes, with respect to each of the operation modes, a plurality of data bits corresponding to the start timings; and each bit is set to 0 or 1 to indicate that an execution of the individual processing program is necessary or unnecessary at the corresponding start timing.

16. A method as in claim 13, wherein:

the specified operation mode is the special mode that includes a check mode for checking an operation of the electronic control apparatus and the rewrite mode is for rewriting the stored check information.

17. A method as in claim 16, further comprising:

determining the specified operation mode of the electronic control apparatus before outputting the start commands at the start timings and retrieving only the individual processing program corresponding to the determined specified operation.

18. A method as in claim 12, wherein:

the control object is an internal combustion engine of a vehicle; and the start control program is periodically started in synchronization with rotation of the engine.

19. A method as in claim 12, wherein:

an operation mode check is not included in any of the individual processing programs and is included only in a start control program.

20. A method as in claim 12, wherein:

the specified operation mode is the special mode that includes a check mode for checking an operation of the electronic control apparatus and a rewrite mode for rewriting the operation modes of the individual processing programs.

* * * * *